United States Patent
Ohtani

(10) Patent No.: US 9,020,863 B2
(45) Date of Patent: Apr. 28, 2015

(54) INFORMATION PROCESSING DEVICE, INFORMATION PROCESSING METHOD, AND PROGRAM

(75) Inventor: Shinya Ohtani, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 13/604,943

(22) Filed: Sep. 6, 2012

(65) Prior Publication Data

US 2013/0108180 A1    May 2, 2013

(30) Foreign Application Priority Data

Oct. 26, 2011    (JP) ................................. 2011-234553

(51) Int. Cl.
 G06F 15/18    (2006.01)
 G06N 5/02    (2006.01)
 G06K 9/62    (2006.01)

(52) U.S. Cl.
 CPC .................................... G06K 9/6221 (2013.01)

(58) Field of Classification Search
 USPC ............................................................ 706/12
 See application file for complete search history.

(56) References Cited

U.S. PATENT DOCUMENTS

| 7,426,497 B2 * | 9/2008 | Bacioiu et al. | 706/12 |
| 7,813,835 B2 * | 10/2010 | Fujita et al. | 700/245 |
| 7,987,091 B2 * | 7/2011 | Aoyama et al. | 704/245 |
| 7,987,147 B2 * | 7/2011 | Ohtani et al. | 706/45 |
| 8,295,556 B2 * | 10/2012 | Ohtani et al. | 382/118 |
| 8,341,098 B2 * | 12/2012 | Tateno et al. | 706/12 |
| 8,650,140 B2 * | 2/2014 | Tateno et al. | 706/12 |

FOREIGN PATENT DOCUMENTS

JP    9-212492    8/1997

OTHER PUBLICATIONS

A low cost acceleration method for hardware trojan detection based on fan-out cone analysis Bin Zhou ; Wei Zhang ; Thambipillai, S. ; Teo, J.K.J. Hardware/Software Codesign and System Synthesis (CODES+ISSS), 2014 International Conference on DOI: 10.1145/2656075.2656077 Publication Year: 2014 , pp. 1-10.*

A Threshold-Based Relay Switching Protocol for Enhanced Capacity and Resource Efficiency Yeejung Kim ; Taehonn Kim ; Hoon Kim ; Sunghun Kim ; Youngnam Han Communications Letters, IEEE vol. 15 , Issue: 10 DOI: 10.1109/LCOMM.2011.082011.111438 Publication Year: 2011 , pp. 1088-1090.*

(Continued)

*Primary Examiner* — Michael B Holmes

(74) *Attorney, Agent, or Firm* — Oblon, McClelland, Maier & Neustadt, L.L.P.

(57) ABSTRACT

An information processing device includes: a clustering standard selection unit selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value; and an exhibit control unit controlling the exhibit of a cluster or an item based on the selected clustering standard.

13 Claims, 18 Drawing Sheets

(56) References Cited

OTHER PUBLICATIONS

Energy based spectrum sensing using wavelet transform for fading channels Bektas, C. ; Akan, A. ; Odabasioglu, N. Ultra Modern Telecommunications and Control Systems and Workshops (ICUMT), 2012 4th International Congress on DOI: 10.1109/ICUMT.2012.6459666 Publication Year: 2012 , pp. 207-211.*

Degradation analysis method based on regression time series model under equal and unequal variances Lin Fengchun ; Chen Yunxia ; Kang Rui Prognostics and System Health Management Conference (PHM-Shenzhen), 2011 DOI: 10.1109/PHM.2011.5939516 Publication Year: 2011 , pp. 1-7.*

* cited by examiner

FIG. 12

| CLUSTER | KNOWN TYPE CLUSTER PROBABILITY | UNKNOWN TYPE CLUSTER PROBABILITY |
|---|---|---|
| C1 | 0.9 | 0.1 |
| C2 | 0.9 | 0.1 |
| C3 | 0.3 | 0.7 |
| C4 | 0.2 | 0.8 |
| C5 | 0.1 | 0.9 |
| C6 | 0.1 | 0.9 |

INFORMATION PROCESSING DEVICE, INFORMATION PROCESSING METHOD, AND PROGRAM

BACKGROUND

The present disclosure relates to an information processing device, an information processing method, and a program, and particularly relates to an information processing device, an information processing method, and a program used favorably in a case where various items are exhibited.

In the related art, a method of predicting the knowledge status of a user for whom the information amount of knowledge status is small using the knowledge statuses of other users has been proposed (for example, refer to Japanese Unexamined Patent Application Publication No. 9-212492.

For example, on a search engine, a shopping website, or the like, using such a method, estimating whether an item is known or unknown to a user, exhibiting unknown items to the user, and performing recommendation and the like are able to be considered.

SUMMARY

However, since a user is not familiar with an unknown item, if the unknown item is merely exhibited, it is difficult for the user to accept the item, for example, to reference information relating to the item or purchasing the item.

It is desirable for the user to be able to receive unknown items easily.

An information processing device according to a first embodiment of the present disclosure includes: a clustering standard selection unit selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value; and an exhibit control unit controlling the exhibit of a cluster or an item based on the selected clustering standard.

The exhibit control unit may perform a control to exhibit the first number of known type clusters and the second number of unknown type clusters from clusters of the selected clustering standard.

The exhibit control unit may perform a control to exhibit the first number of known type clusters and the second number of unknown type clusters along with at least a portion of the items included in each cluster.

The exhibit control unit may perform a control to further exhibit each item along with the clusters to which the items belong.

The exhibit control unit may perform a control to distinguish between and exhibit the known type clusters and the unknown type clusters.

The clustering selection unit may select the probabilities of the first number of cluster groups with the highest probabilities and the clustering standard with the greatest possibility of the probabilities of other cluster groups being generated from a different probability distribution.

The clustering standard selection unit may selects a clustering standard from the clustering standards that are equal in number of clusters to a total of the first number and the second number.

A clustering standard learning unit performing learning of a model for categorizing the items by the clustering standards may be further provided.

A clustering standard information collection unit collecting information relating to the clustering standards may be further provided.

An item categorization unit categorizing items known to the user and items unknown to the user may be further provided.

An item discriminator learning unit performing learning of an item discriminator for discriminating whether an item is known to the user or is unknown to the user may be further provided.

An information processing method according to the first embodiment of the present disclosure includes: causing an information processing device to select a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value; and causing the information processing device to control the exhibit of a cluster or an item based on the selected clustering standard.

A program according to the first embodiment of the present disclosure causes a computer to execute: selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value; and controlling the exhibit of a cluster or an item based on the selected clustering standard.

An information processing device according to a second embodiment of the present disclosure includes: a clustering standard selection unit selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value, which is also the clustering standard with the greatest possibility of the probabilities of the first number of cluster groups with the highest probabilities and the probabilities of other cluster groups being generated from a different probability distribution; and an exhibit control unit controlling the exhibit of a cluster or an item based on the selected clustering standard.

According to the first embodiment of the present disclosure, a clustering standard including a first number or more known type clusters in which the probability that an item belonging to a cluster is known to a user is equal to or greater than a first threshold value and a second number or more unknown type clusters in which the probability is equal to or less than a second threshold value which is less than the first threshold value is selected from clustering standards categorizing items into a plurality of clusters, and the exhibit of a cluster or an item is controlled based on the selected clustering standard.

According to the second embodiment of the present disclosure, a clustering standard including a first number or more known type clusters in which the probability that an item belonging to a cluster is known to a user is equal to or greater than a first threshold value and a second number or more unknown type clusters in which the probability is equal to or less than a second threshold value which is less than the first threshold value, which is also the clustering standard with the greatest possibility of the probabilities of the first number of cluster groups with the highest probabilities and the probabilities of other cluster groups being generated from a different probability distribution, is selected from clustering standards categorizing items into a plurality of clusters, and the exhibit of a cluster or an item is controlled based on the selected clustering standard.

According to the first embodiment or the second embodiment of the present disclosure, it is easier for the user to accept an unknown item.

BRIEF DESCRIPTION OF THE DRAWINGS

FIG. 12 is a view for describing an example of the selection method of a clustering standard;

DETAILED DESCRIPTION OF EMBODIMENTS

Embodiments of the present disclosure (hereinafter referred to as embodiments) will be described below. Here, description will be given in the following order.

1. Embodiments
2. Modification Examples

1. EMBODIMENTS

Configuration Example of Information Processing System 1

Figure 1:
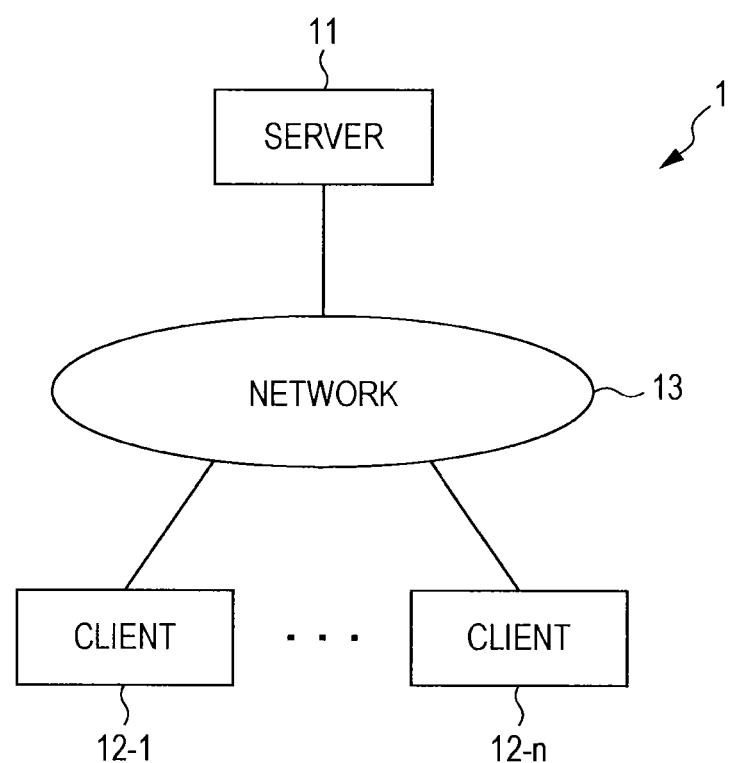
FIG. 1 is a block diagram illustrating an embodiment of an information processing system to which embodiments of the present disclosure are applied.

FIG. 1 is a block diagram illustrating an embodiment of an information processing system 1 to which the embodiments of the present disclosure are applied.

The information processing system 1 includes a server 11 and clients 12-1 to 12-n. The server 11 and the clients 12-1 to 12-n are connected to one another via a network 13.

The server 11 provides predetermined services to the clients 12-1 to 12-n via the network 13 and performs an exhibit of items used in the services.

Here, the services that the server 11 provides are not limited to specific types, and examples thereof include information searching services, shopping websites, community websites such as SNSs (Social Networking Services), and the like.

Further, the items that the server 11 exhibits are not limited to specific types either, and examples thereof include various contents and products such as videos, still images, books, documents, musical tracks, television programs, software, news articles, blog posts, microblogs, and information, and community website users, communities, and the like.

The clients 12-1 to 12-n are configured by devices that are able to use the services that the server 11 provides such as, for example, personal computers, mobile information terminals, mobile phones, and audio players. Furthermore, the user uses the services that the server 11 provides using the clients 12-1 to 12-n.

Hereinafter, in a case where it is may not important to individually distinguish between the clients 12-1 to 12-n, the clients 12-1 to 12-n will be referred to simply as a client 12.

Configuration Example of Server 11

Figure 2:
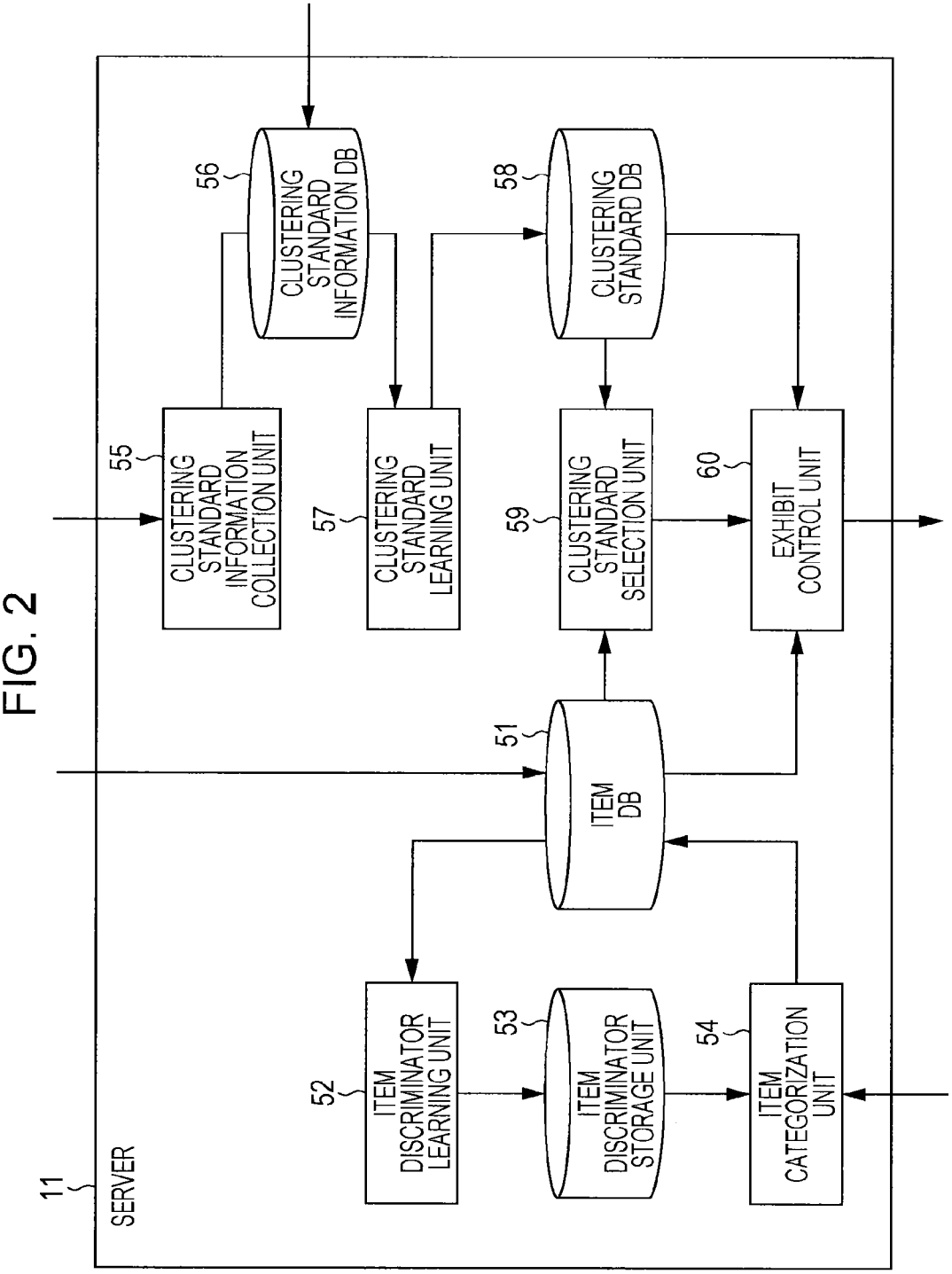
FIG. 2 is a block diagram illustrating a configuration example of the functions of a server.

FIG. 2 is a block diagram illustrating a configuration example of the functions of the server 11. The server 11 includes an item DB (database) 51, an item discriminator learning unit 52, an item discriminator storage unit 53, an item categorization unit 54, a clustering standard information collection unit 55, a clustering standard information DB (database) 56, a clustering standard learning unit 57, a clustering standard DB (database) 58, a clustering standard selection unit 59, and an exhibit control unit 60.

Information relating to the items used in the services that the server 11 provides accumulates in the item DB 51.

The item discriminator learning unit 52 performs learning of item discriminators used to discriminate whether each item registered in the item DB 51 is an item of a known type (hereinafter referred to as a known type item) to the user or an item of an unknown type (hereinafter referred to as an unknown type item). The item discriminator learning unit 52 stores information relating to the item discriminators obtained as a result of the learning in the item discriminator storage unit 53.

The same number of item discriminators corresponding to each user using the services that the server 11 provides as there are users are stored in the item discriminator storage unit 53.

The item categorization unit 54 categorizes the items registered in the item DB 51 into known type items and unknown type items for each user based on various pieces of information input from the outside (for example, the item usage history and the like for each user) and the item discriminators stored in the item discriminator storage unit 53. The item categorization unit 54 accumulates the categorized results in the item DB 51.

The clustering standard information collection unit 55 collects information relating to the clustering standards (hereinafter referred to as clustering standard information) used in the categorization of items from other servers (not shown) connected to the network 13, and accumulates the information in the clustering standard information DB 56.

The name and the like of each cluster categorized by the clustering standard is included, for example, in the clustering standard information. For example, in a case where the item is a book, a collection of cluster names including (Japanese, Math, Science, Social Studies, English, Music) is included in clustering standard information relating to a clustering standard based on subjects.

Clustering standard information collected by the clustering standard information collection unit 55 or input from the outside is accumulated in the clustering standard information DB 56. Further, learning samples used in the learning of a model for categorizing items according to each clustering standard are input and accumulated in the clustering standard information DB 56.

The clustering standard learning unit 57 performs learning of models for categorizing the items according to the clustering standards registered in the clustering standard information DB 56. The clustering standard learning unit 57 accumulates functions, parameters, and the like representing the model for each clustering standard obtained as a result of the learning in the clustering standard DB 58.

The clustering standard selection unit 59 selects the clustering standard used in the categorization of items when exhibiting the items registered in the item DB 51 to the user from the clustering standards registered in the clustering standard DB 58. The clustering standard selection 59 supplies the information relating to the selected clustering standard to the exhibit control unit 60.

The exhibit control unit 60 categorizes the items registered in the item DB 51 based on the clustering standard selected by the clustering standard selection unit 59. Furthermore, the exhibit control unit 60 generates display control data including a program, data, and the like for displaying a screen exhibiting the items (hereinafter referred to as an item exhibit screen). The exhibit control unit 60 controls the display of the item exhibit screen on the client 12 by transmitting the generated display control data to the client 12 via the network 13.

Item Exhibit Process

Figure 3:
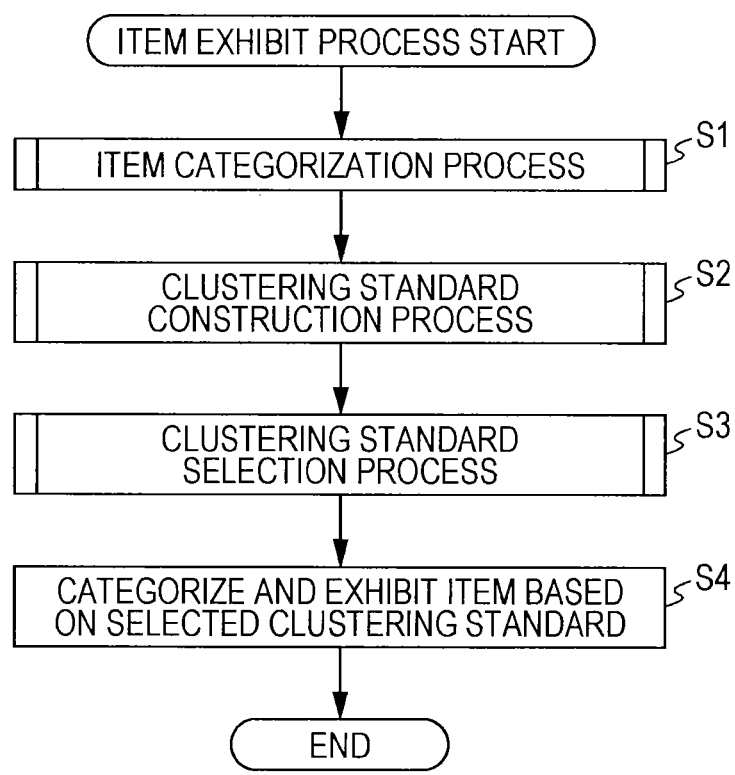
FIG. 3 is a flowchart for describing an item exhibit process.

Next, an item exhibit process executed by the server 11 will be described with reference to the flowchart of FIG. 3.

Here, in order to simplify the description below, attention is focused on one user, and a case where items are exhibited to that user (hereinafter referred to as a target user) will be described. In actuality, the following process is performed for each user of the services that the server 11 provides.

Further, an item space formed by the items registered in the item DB 51 will be represented below as in FIG. 4. Here, in the drawing, individual items represented by white circles, and the similarity of the feature amount between each item is represented by the distance between the items.

In step S1, the server 11 executes an item categorization process.

Item Categorization Process

Figure 5:
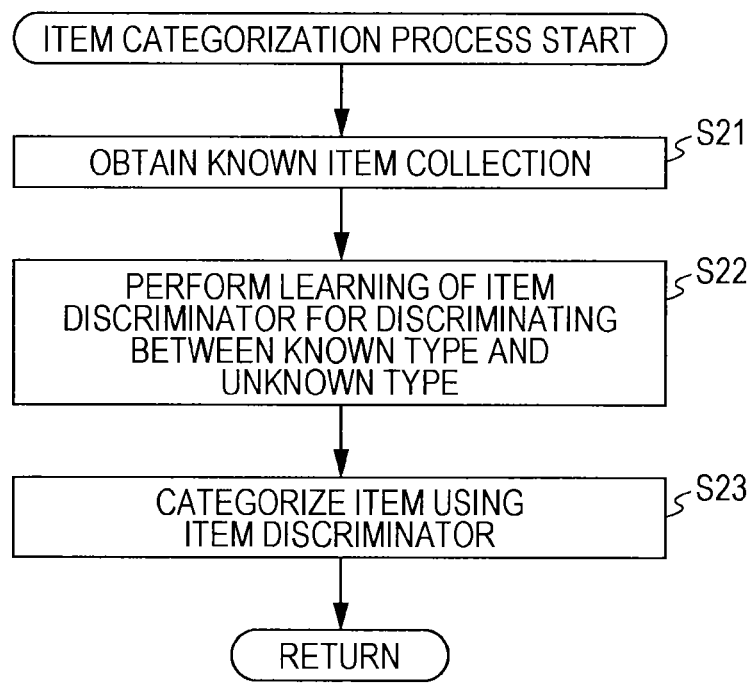
FIG. 5 is a flowchart for describing an item categorization process.

Here, details of the item categorization process will be described with reference to the flowchart of FIG. 5.

In step S21, the item categorization unit 54 obtains a known item collection. That is, the item categorization unit 54 extracts items that are known to the target user from the items registered in the item DB 51.

Here, the method of extracting items that are known to the target user is not limited to a specific method, and an arbitrary method is able to be adopted. For example, the known items may be extracted based on the browsing history, the use history, or the like of items by the target user in the past. Alternatively, for example, a list of items or the like may be exhibited to the target user to select the known items.

The item categorization unit 54 adds information indicating that an item is known to the target user (hereinafter referred to as a known item) to information relating to the items extracted from the item DB 51.

Figure 4:
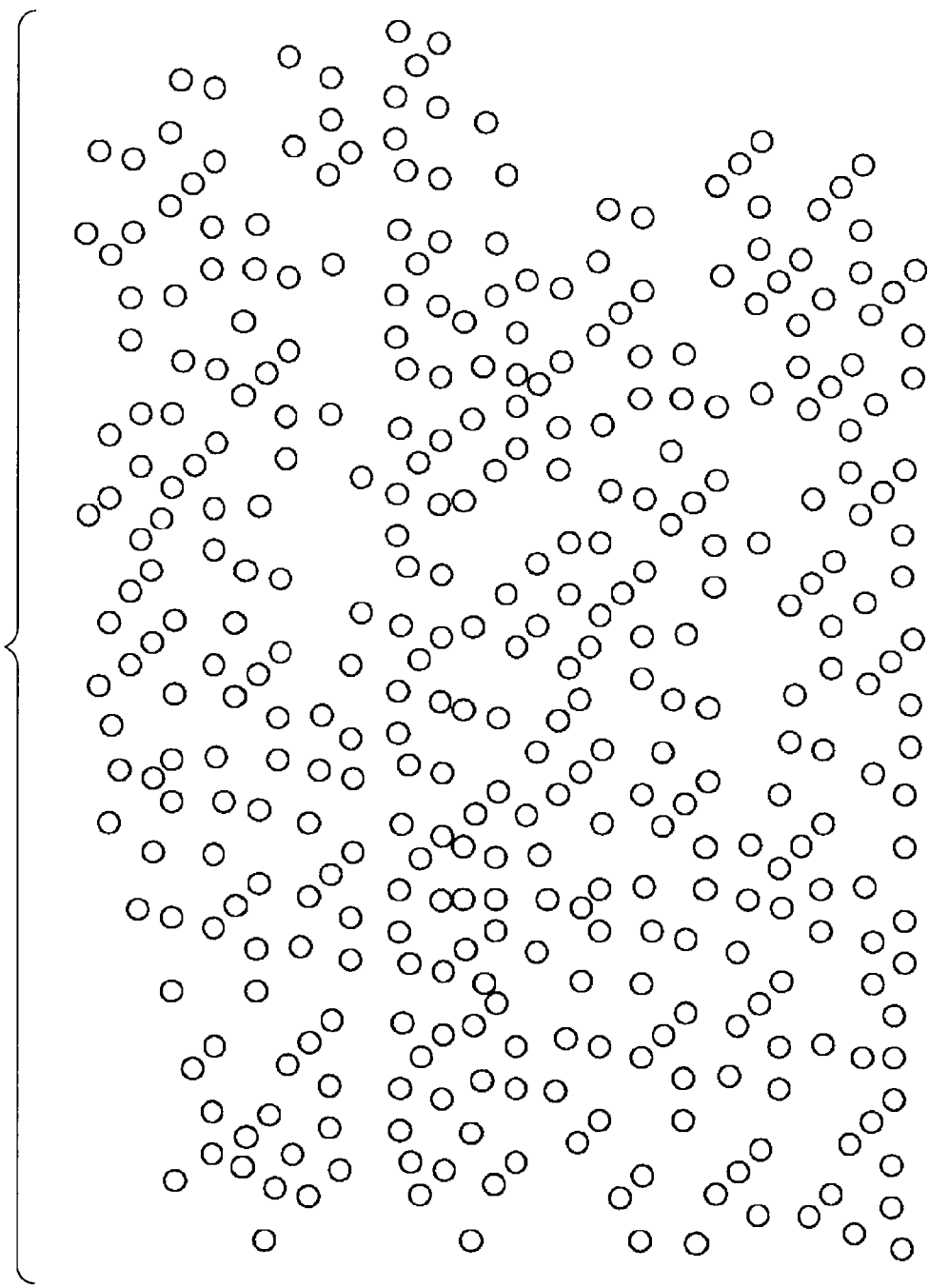
FIG. 4 is a view illustrating an example of an item space.
Figure 6:
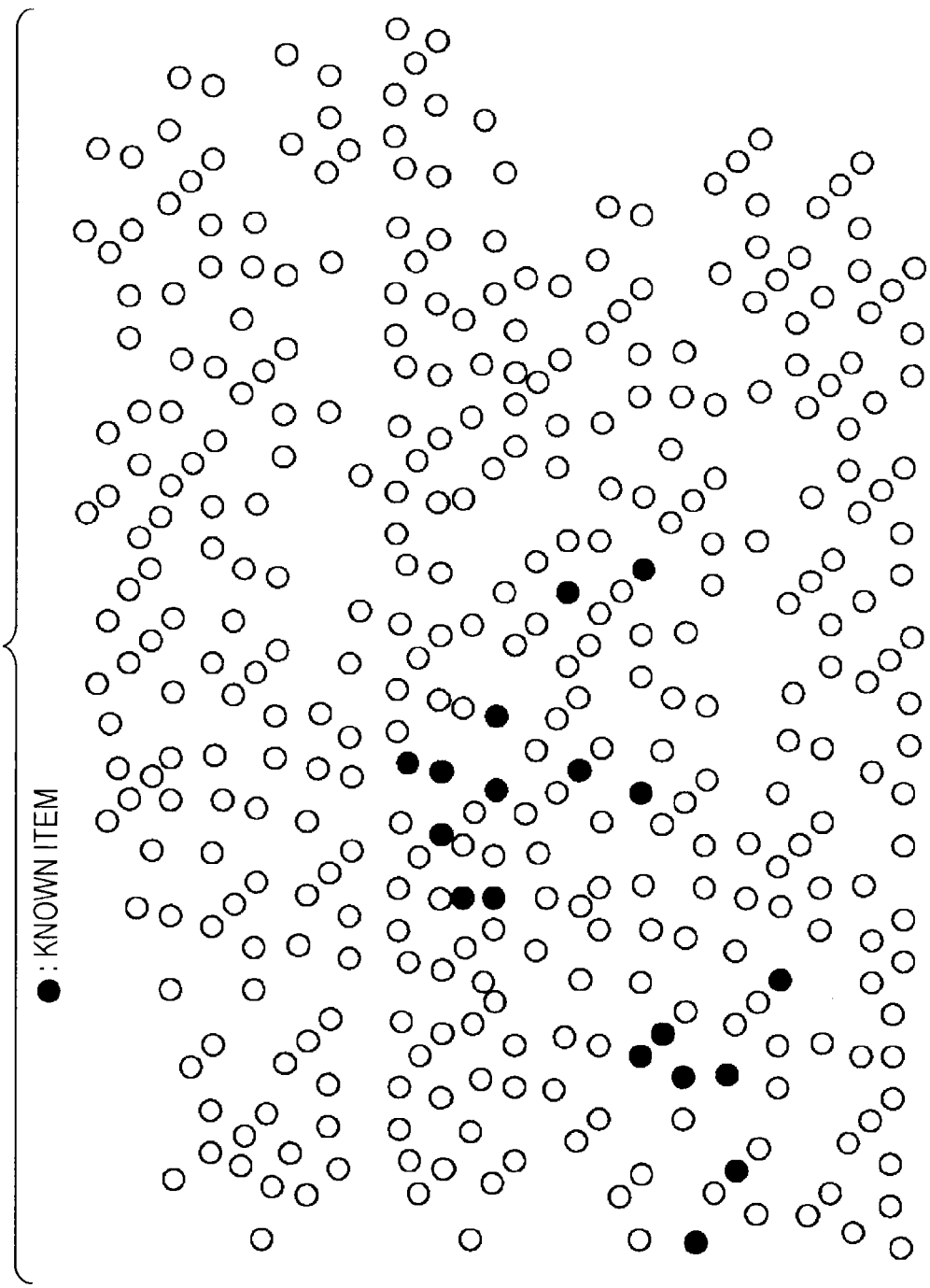
FIG. 6 is a view for describing a specific example of the item categorization process.

FIG. 6 illustrates the state of the item space after the process of step S21 is performed on the item space of FIG. 4.

Figure 7:
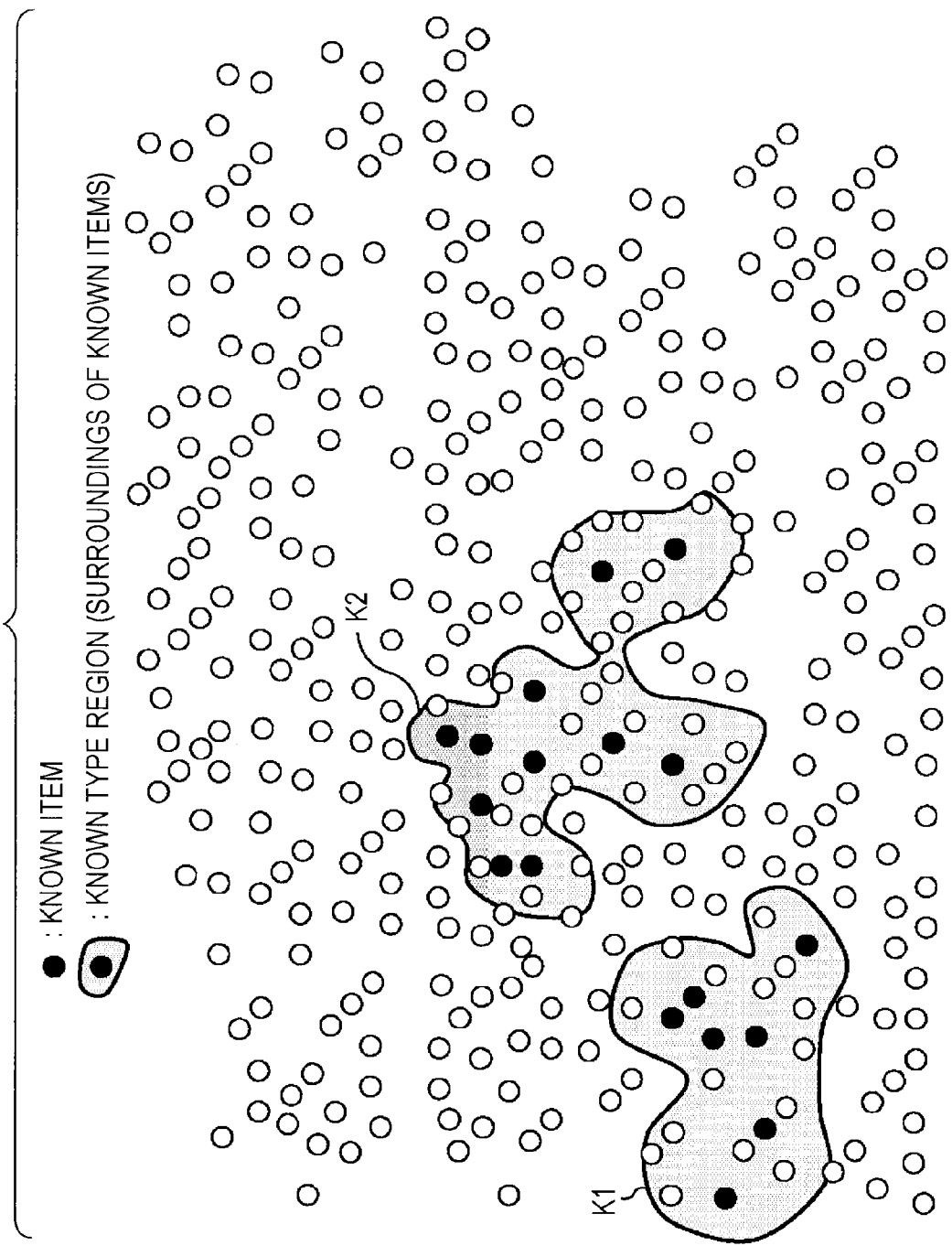
FIG. 7 is a view for describing another specific example of the item categorization process.

In step S22, the item discriminator learning unit 52 performs learning of the item discriminators for discriminating between known types and unknown types. Through such a process, item discriminators discriminating whether each item is a known type or an unknown type to the target user are generated based on, for example, the similarity with the feature amounts of known items. More specifically, for example, item discriminators designating items in the two regions surrounded by frames in the surroundings of the known items within FIG. 7 (hereinafter referred to as known type regions K1 and K2) as known types and designating others as unknown types are generated.

Here, the learning method of the item discriminators is not limited to a specific method, and an arbitrary method is able to be adopted.

The item discriminator learning unit 52 causes the item discriminator storage unit 53 to store information relating to the item discriminators obtained as a result of the learning.

In step S23, the item categorization unit 54 categorizes the items using the item discriminators. Specifically, the item categorization unit 54 determines whether an item is a known type or an unknown type using the item discriminators for all items other than the known items.

In so doing, all items registered in the item DB 51 are categorized into known type items and unknown type items. Here, in addition to known items that are recognizes as being known to the target user, the known type items include items with a high probability of being known and items that are similar to the known items.

The item categorization unit 54 adds information indicating whether an item is a known type or an unknown type to the target user is added to the information relating to each item in the item DB 51.

Figure 8:
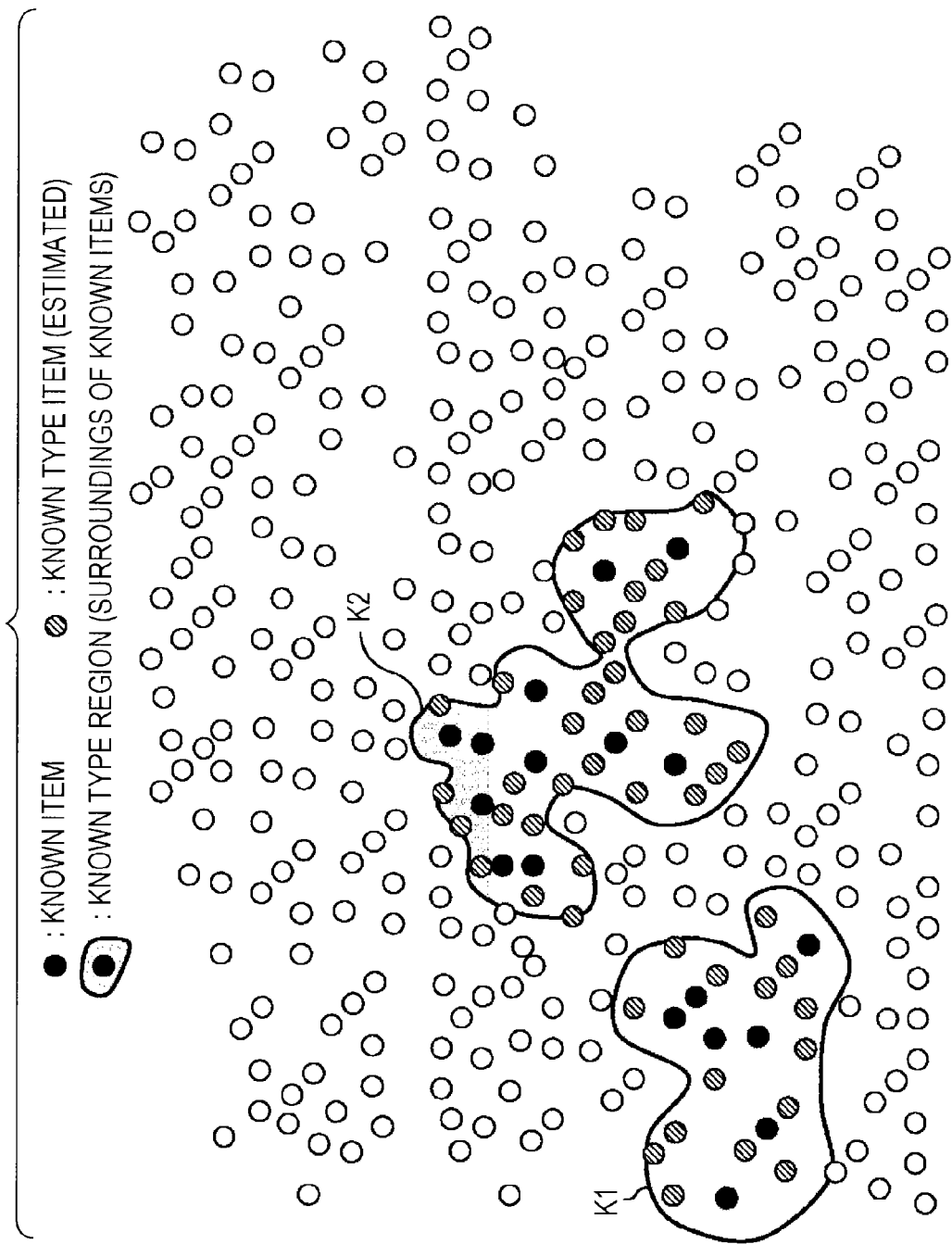
FIG. 8 is a view for describing still another specific example of the item categorization process.

Through such a process, for example, as illustrated in FIG. 8, the items within the known type region K1 and the known type region K2 are categorized as known type items. Here, in the drawing, known type items that are not known types are indicated by hatching.

The item categorization process then ends.

Returning to FIG. 3, in step S2, the server 11 executes a clustering standard construction process.

Clustering Standard Construction Process

Figure 9:
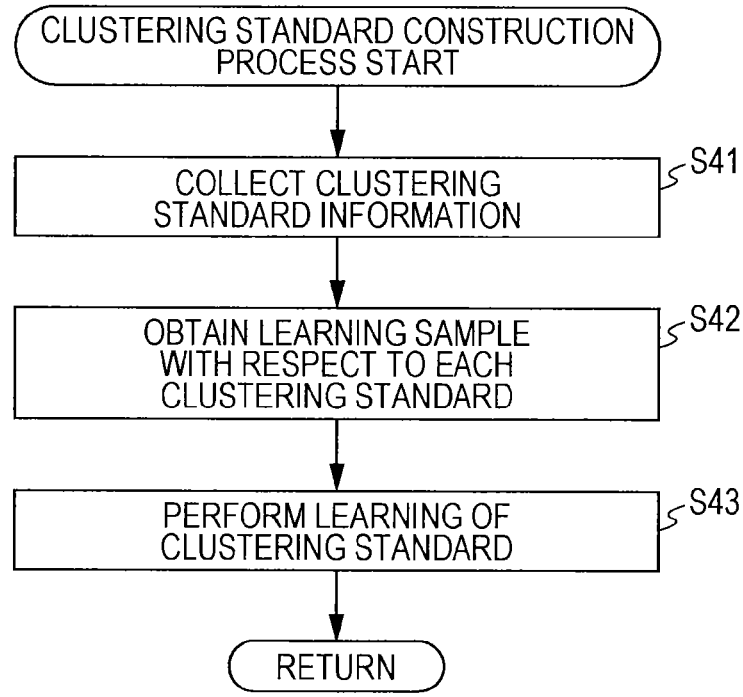
FIG. 9 is a flowchart for describing a clustering standard construction process.

Here, details of the clustering standard construction process will be described with reference to the flowchart of FIG. 9.

In step S41, the server 11 collects clustering standard information. That is, the server 11 collects information relating to clustering standards that are able to be applied to the categorization of the items registered in the item DB 51.

Here, the collection method of the clustering standard information is not limited to a specific method, and an arbitrary method is able to be adopted. For example, manually created clustering standard information may be input into the clustering standard information DB 56.

Alternatively, for example, clustering standards may be generated automatically based on the feature amounts of the items in the item DB 51, and each cluster in the automatically generated clustering standards may be manually named and input into the clustering standard information DB 56.

Alternatively, for example, the clustering standard information collection unit 55 may mechanically collect, via the network 13, information relating to the applicable clustering standards from websites and the like of various services (for example, shopping and the like) that other servers and the like provide.

Here, it is desirable that each cluster name be a name that is easily understood by people. Further, it is desirable that a name that shows the relationship between clusters be given to each cluster within the same clustering standard.

The clustering standard information collection unit 55 accumulates the collected clustering standard information in the clustering standard information DB 56.

In step S42, the server 11 obtains the learning samples for each clustering standard.

For example, the service administrator selects one of the clustering standards for which the clustering standard information is accumulated in the clustering standard information DB 56. Furthermore, the service administrator categorizes a portion of the items registered in the item DB 51 based on the selected clustering standard, and makes the information indicating the categorized results the learning sample for the clustering standard. By performing the above for each clustering standard, learning samples for each clustering standard are generated.

Furthermore, the service administrator inputs the learning samples for each clustering standard into the clustering standard information DB 56.

In step S43, the clustering standard learning unit 57 performs learning of the clustering standards. Specifically, the clustering standard learning unit 57 selects one of the clustering standards for which the clustering standard information is accumulated in the clustering standard information DB 56. Furthermore, the clustering standard learning unit 57 obtains the clustering standard information and the learning sample relating to the selected clustering standard from the clustering standard information DB 56.

Furthermore, the clustering standard learning unit 57 performs learning of models for categorizing items to each cluster of the clustering standard based on the feature amount of each item included in the learning sample of the selected clustering standard.

The clustering standard learning unit 57 constructs models for each clustering standard by executing the above for all clustering standards. Furthermore, the clustering standard learning unit 57 accumulates the functions, parameters, and the like representing the models for each clustering standard in the clustering standard DB 58.

The clustering standard construction process then ends.

Returning to FIG. 3, in step S3, the clustering standard selection unit 59 executes a clustering standard selection process.

Clustering Standard Selection Process

Figure 10:
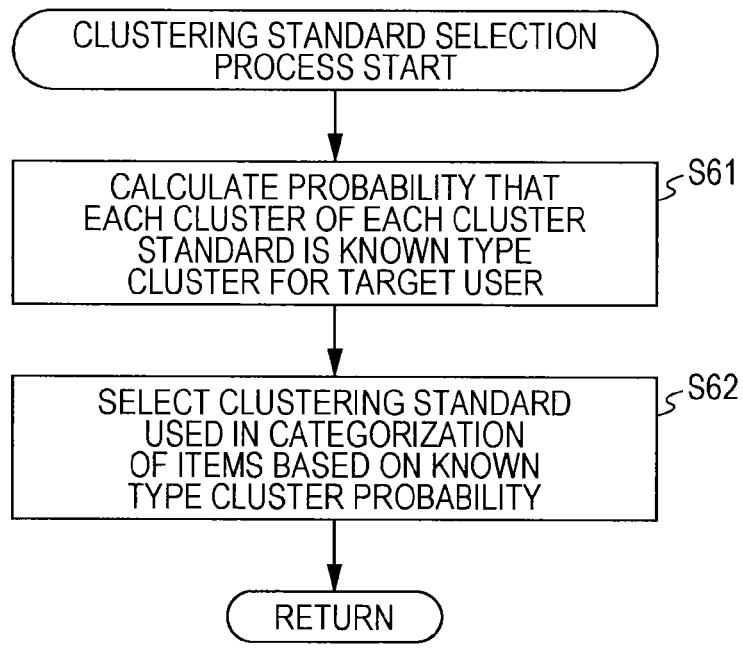
FIG. 10 is another flowchart for describing a clustering standard construction process.

Here, details of the clustering standard selection process will be described with reference to the flowchart of FIG. 10.

Here, a case where the number of known type clusters exhibited to the target user is set to L and the number of unknown type clusters is set to M will be described below.

Figure 11:
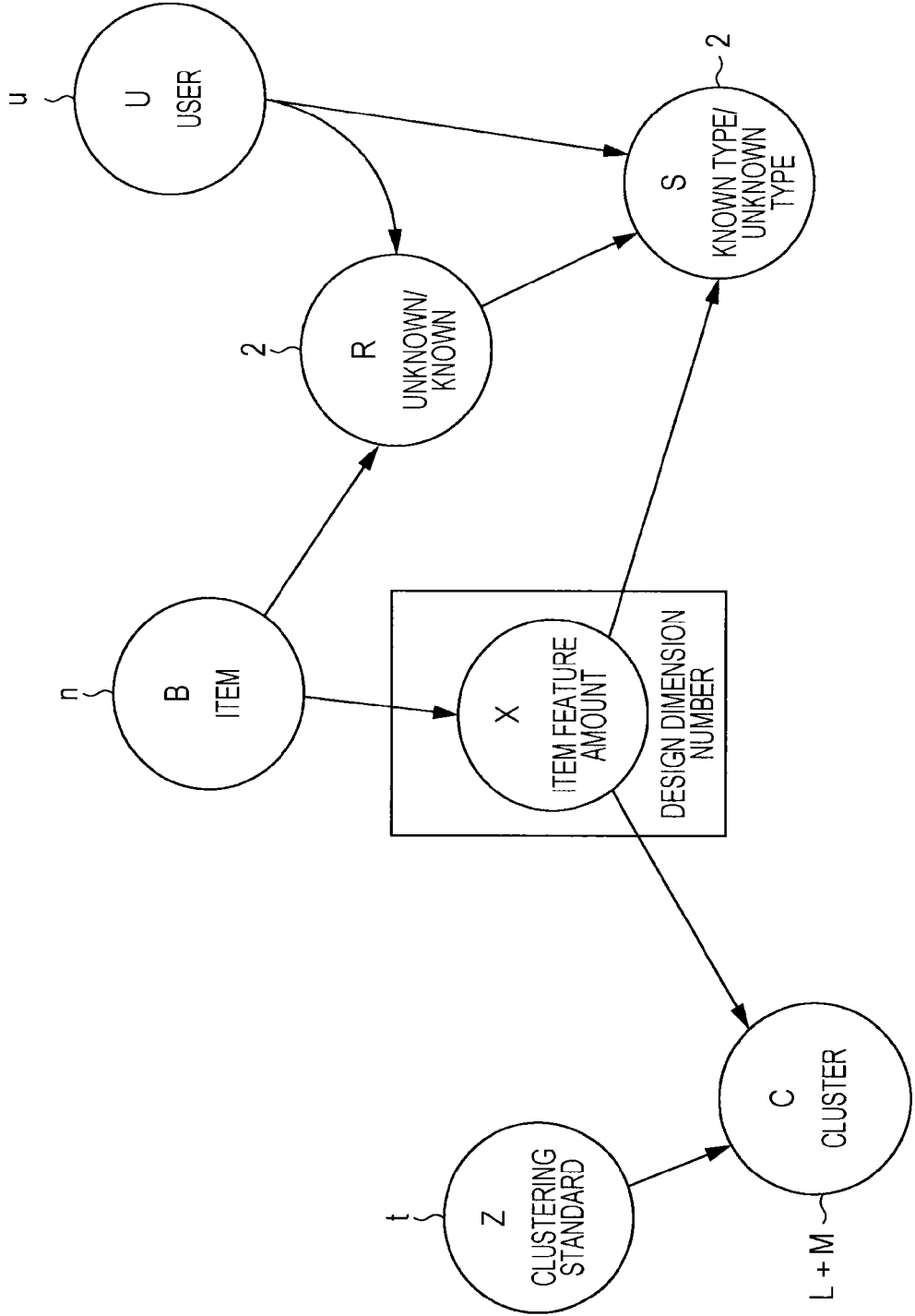
FIG. 11 is a view representing an example of a probability model used in the selection of a clustering standard as a Bayesian network.

Further, FIG. 11 represents an example of the calculation technique used in the selection of the clustering standard as a Bayesian network. The Bayesian network is formed of seven nodes of a user U, an item B, a clustering standard Z, an item feature amount X, known or unknown R, known type or unknown type S, and a cluster C. Here, the numbers or letters indicates by leader lines from each node indicate the number of variables corresponding to each node. For example, the number of variable corresponding to the node of the user U is u, therefore indicating that there are u users.

The joint probability of the probability model is represented as a numerical formula by the following Formula 1.

$$P(Z,C,X,B,R,U,S)=P(U)\cdot P(B)\cdot P(Z)\cdot P(R|B,U)\cdot P(X|B)\cdot P(C|X,Z)\cdot P(S|U,R,X) \quad (1)$$

In step S61, the clustering standard selection unit 59 calculates the probability that each cluster of each cluster standard is a cluster of a known type to the target user.

Specifically, the clustering standard selection unit 59 selects one of the clustering standards for which the number of clusters is L+M, and obtains information relating to the model for the selected clustering standard from the clustering standard DB 58. Furthermore, the clustering standard selection unit 59 performs categorization of the items registered in the item DB 51 using the model for the selected clustering standard.

Furthermore, the clustering standard selection unit 59 calculates the probability that each cluster of the selected clustering standard is a known type cluster (hereinafter referred to as a known type cluster probability). The known type cluster probability is found using $P(S=k|c, z, u)$ from the probability model of FIG. 11. Here, k indicates that the item is a known type, c indicates each cluster, z indicates a certain clustering standard, and u indicates the target user. That is, the known type cluster probability indicates the probability that an item belonging to the cluster is known to the target user, in other words, the proportion of items that are known types to the target users out of the items belonging to the cluster.

The clustering standard selection unit 59 calculates the known type cluster probability for each cluster of each clustering standard by performing the above process for all clustering standards for which the number of clusters is L+M.

In step S62, the clustering standard selection unit 59 selects the clustering standard used in the categorization of items based on the known type cluster probability. Specifically, the clustering standard selection unit 59 selects one of the clustering standards for which the known type cluster probability has been calculated, that is, one of the clustering standards for which the number of clusters is L+M. Furthermore, the clustering standard selection unit 59 divides the clusters of the selected clustering standard into L cluster groups with the highest known type cluster probabilities (hereinafter referred to as known type cluster groups) and the other M cluster groups (hereinafter referred to as unknown type cluster groups).

For example, a case where the known type cluster probability of a clustering standard including clusters C1 to C6 is the value shown in FIG. 12 is considered. Here, the unknown type cluster probability shown in the drawing is the probability of a cluster being an unknown type cluster, and is a value in which the known type cluster probability is subtracted from 1.

For example, in a case where the number of exhibited known type clusters L=2, the clusters are divided into a cluster group formed of the clusters C1 and C2 with the two highest known type cluster probabilities and a cluster group formed of the other clusters C3 to C6. Further, for example, in a case where L=3, the clusters are divided into a cluster group formed of the clusters C1 to C3 with the three highest known type cluster probabilities and a cluster group formed of the other clusters C4 to C6.

Furthermore, the clustering standard selection unit 59 ascertains the p value of the null hypothesis "The known type cluster probabilities of two cluster groups (a known type cluster group and an unknown type cluster group) are generated from different probability distributions".

The greater the p value, the greater the probability of the null hypothesis being correct. That is, the greater the possibility that the known type cluster probabilities of the two cluster groups are generated from different probability distributions. In other words, the greater the possibility that the parent populations of the items belonging to the known type cluster group and the items belonging to the unknown type cluster group are different. That is, the greater the possibility that the parent population of the items belonging to the known type cluster group is a parent population formed approximately of known type items and the parent population of the items belonging to the unknown type cluster group is a parent population formed approximately of known type items.

The clustering standard selection unit 59 performs the process for all clustering standards for which the number of clusters is L+M to find the p value of the null hypothesis described above. Furthermore, the clustering standard selection unit 59 selects the clustering standard with the greatest p value as the clustering standard used in the categorization of the items (hereinafter referred to as an applied clustering standard).

Here, an example in which the applied clustering standard is selected in a case where the number of exhibited known type clusters L=2 will be described with reference to FIGS. 13 to 15. Here, FIGS. 13 to 15 illustrate examples in which the item space illustrated in FIG. 8 is divided based on three different clustering standards.

Figure 13:
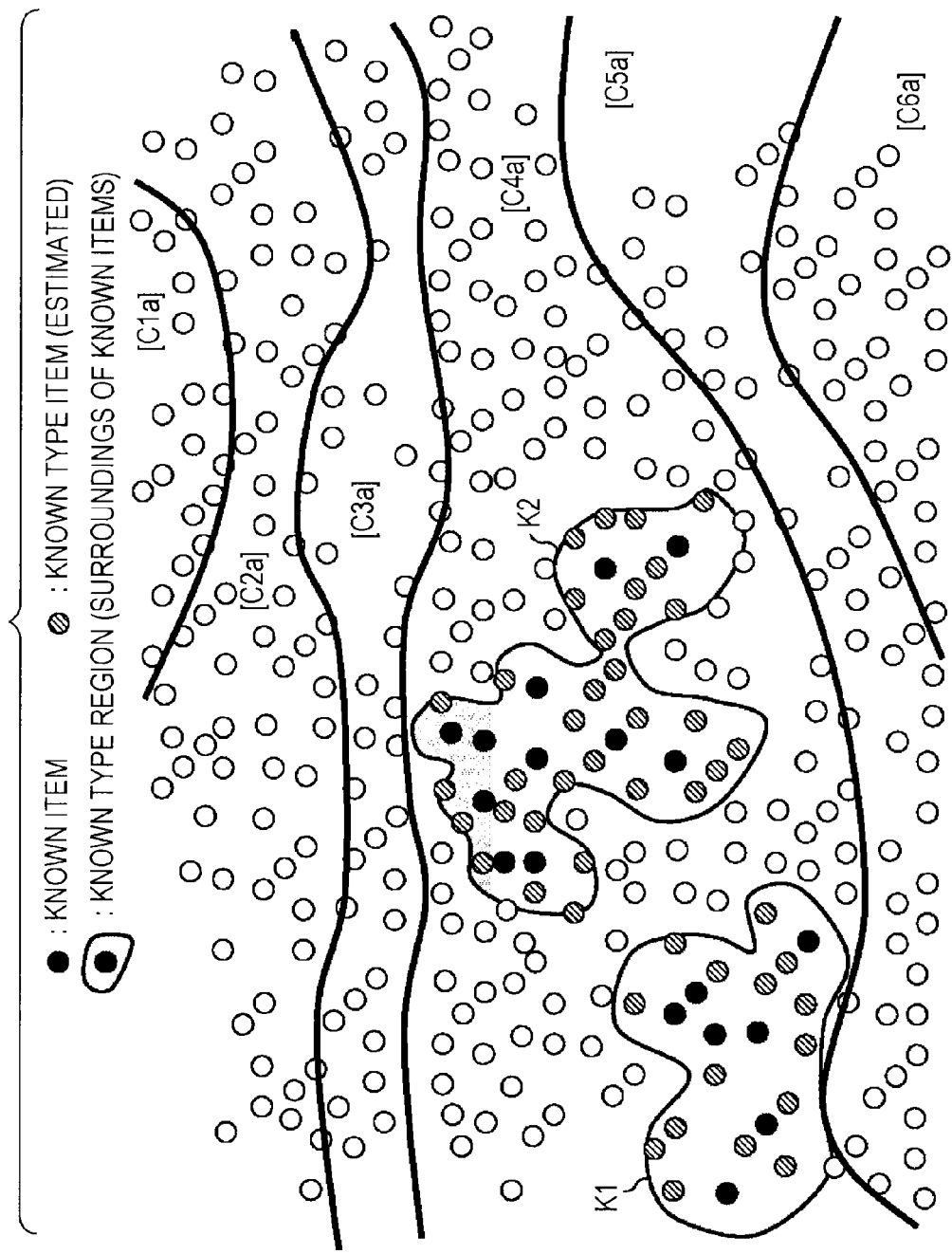
FIG. 13 is another view for describing an example of the selection method of a clustering standard.

Specifically, FIG. 13 illustrates an example in which the item space is divided based on a clustering standard formed of clusters C1a to C6a. In the example, the cluster C4a includes both known type regions K1 and K2, and the known type items are only included in the cluster C4a. Further, while the cluster C4a includes many known type items, the cluster C4a also includes many unknown type clusters. Therefore, the cluster C4a and one other cluster are selected as the known type cluster group, and the remaining clusters are selected as the unknown type cluster group.

Figure 14:
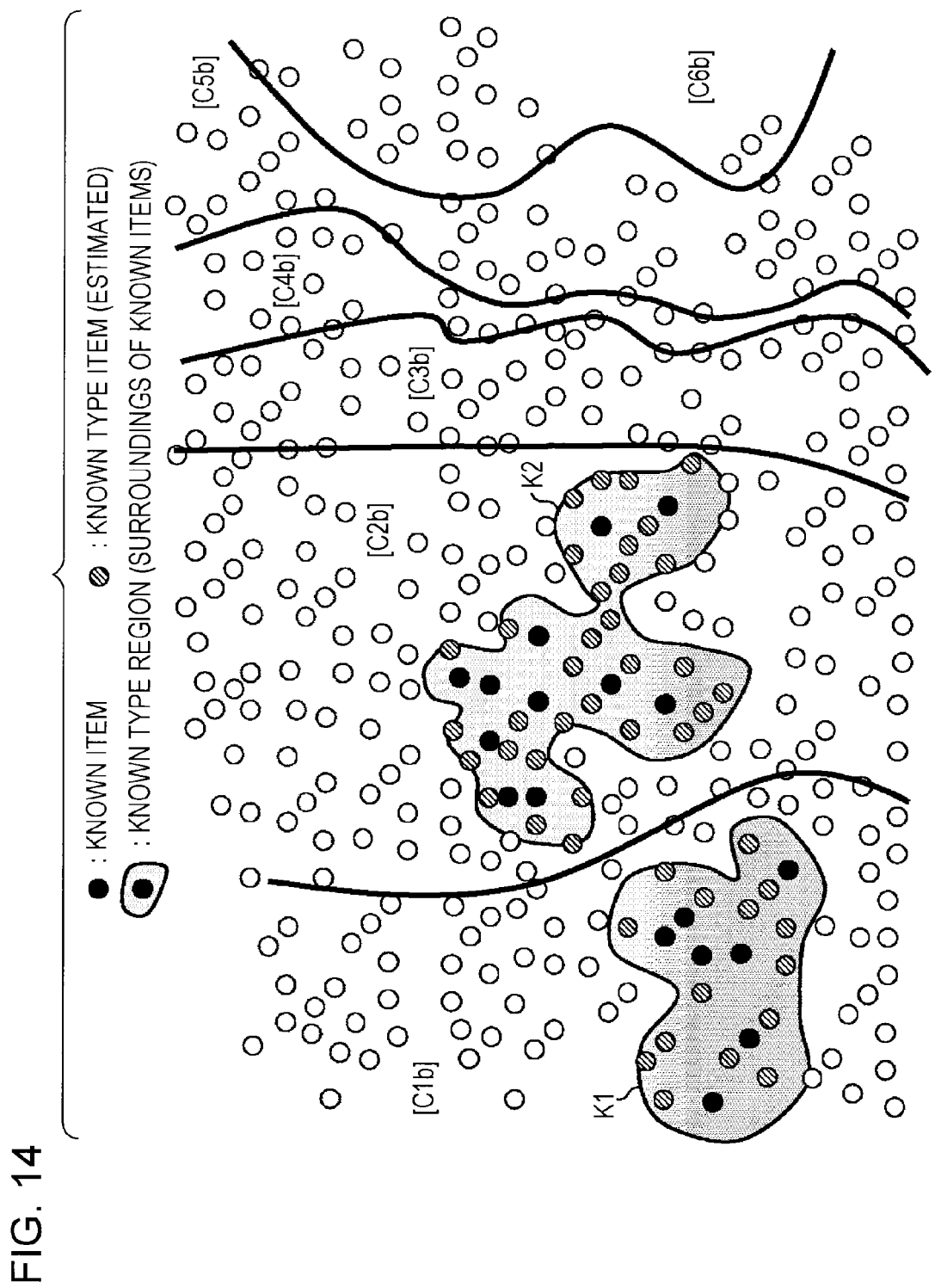
FIG. 14 is a view for describing another example of the selection method of a clustering standard.

FIG. 14 illustrates an example in which the item space is divided based on a clustering standard formed of clusters C1b to C6b. In the example, the cluster C1b includes the known type region K1, the cluster C2b includes the known type region K2, and the known type items are divided between the two clusters. Therefore, the cluster C1b and the cluster C2b are selected as the known type cluster group, and the clusters C3b to C6b are selected as the unknown type cluster group. Here, while both the cluster C1b and the cluster C2b include many known type items, both also include many unknown type items.

Figure 15:
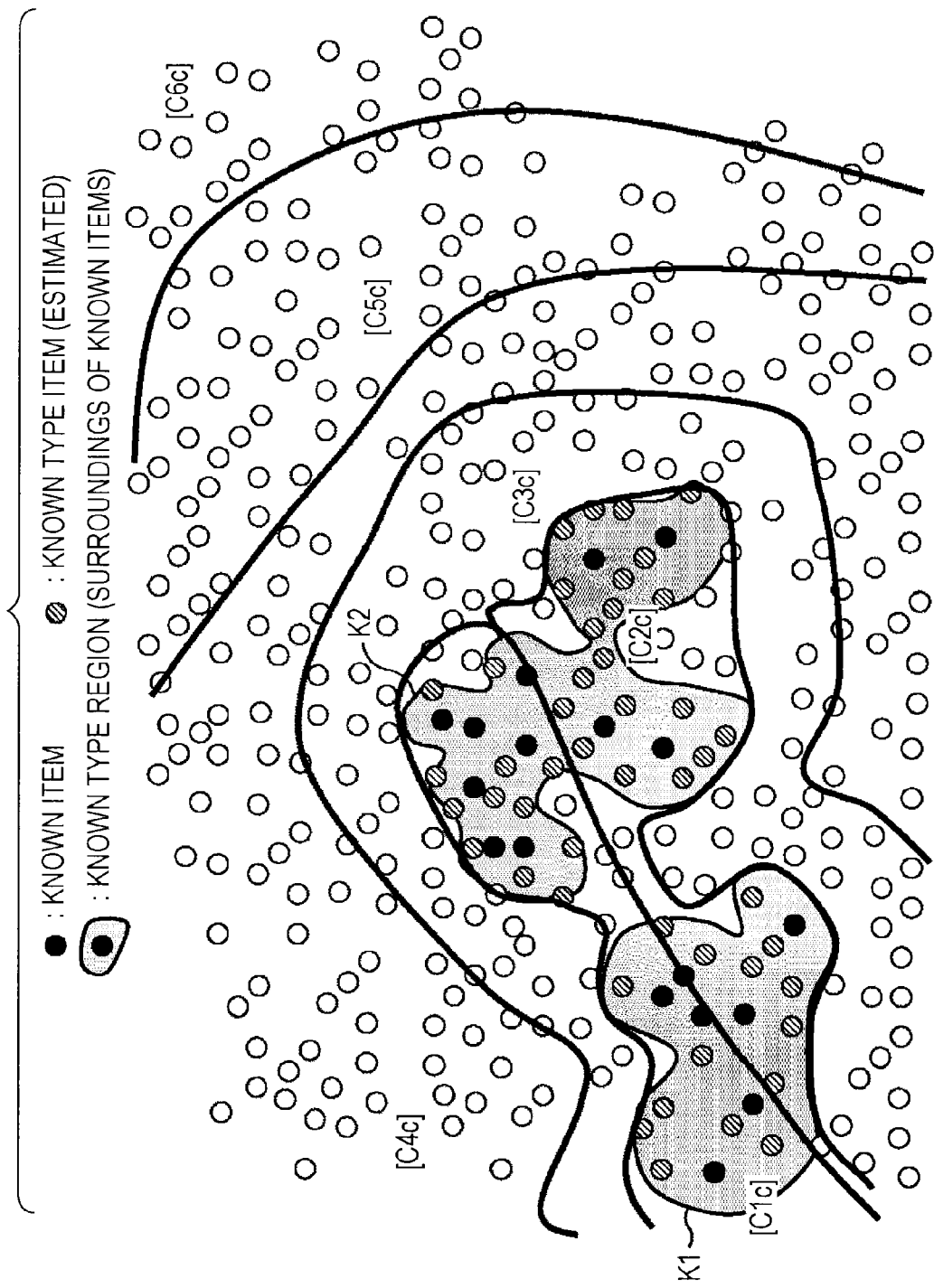
FIG. 15 is a view for describing still another example of the selection method of a clustering standard.

FIG. 15 illustrates an example in which the item space is divided based on a clustering standard formed of clusters C1c to C6c. In the example, the known type item is divided into the two clusters of the cluster C1c and the cluster C2c. Therefore, the cluster C1c and the cluster C2c are selected as the known type cluster group, and the clusters C3c to C6c are selected as the unknown type cluster group. Further, both the cluster C1c and the cluster C2c mostly include known type items, and hardly include any unknown type items.

In such a case, in the clustering standard of FIG. 15, the difference between the probability distribution of the known type items in the known type cluster group and the probability distribution of the known type items in the unknown type cluster group is the greatest, and the p value described above is the greatest. As a result, the clustering standard of FIG. 15 is selected.

In such a manner, many more known type clusters are included in the L clusters with the highest known type cluster probabilities, and the clustering standard with the fewest unknown type clusters included in the L clusters is selected as the applied clustering standard.

Furthermore, the clustering standard selection unit 59 supplies the applied clustering standard and information indicating the known type cluster probability of each cluster of the applied clustering standard to the exhibit control unit 60.

The clustering standard selection process is then ended.

Returning to FIG. 3, in step S4, the exhibit control unit 60 categorizes and exhibits items based on the selected clustering standard (that is, the applied clustering standard). Specifically, the exhibit control unit 60 categorizes the items registered in the item DB 51 based on the applied clustering standard.

Further, the exhibit control unit 60 selects the L clusters with the highest known type cluster probabilities from the clusters of the applied clustering standard as the known type clusters. Furthermore, the exhibit control unit 60 selects the remaining M clusters of the applied clustering standard to be the unknown type clusters.

Furthermore, the exhibit control unit 60 generates display control data for displaying an item exhibit screen categorizing and exhibiting items based on the applied clustering standard, and transmits the display control data to the client 12 of the target user via the network 13.

The client 12 receiving the display control data starts or updates the display of the item exhibit screen based on the received display control data.

Figure 16:
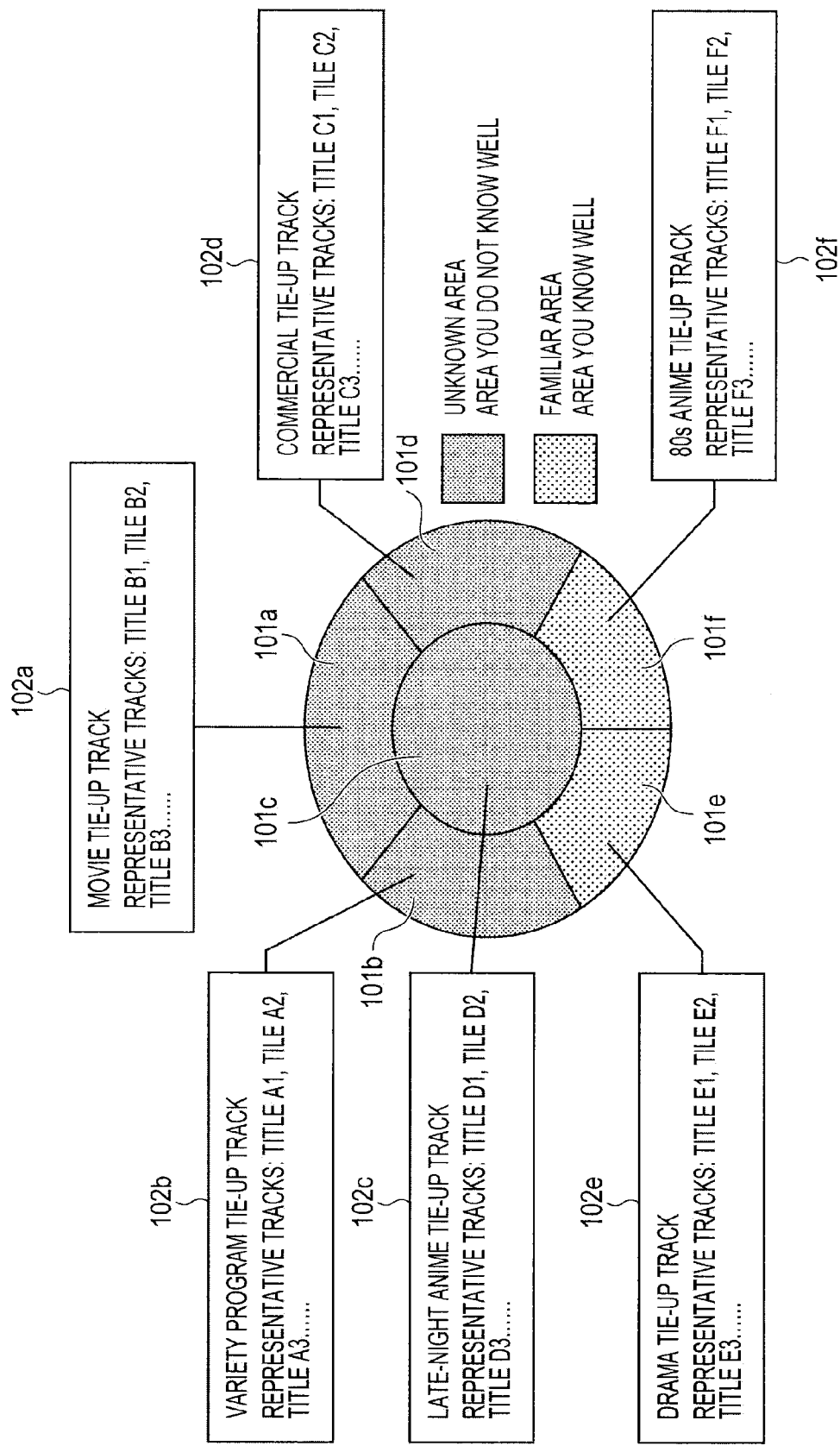
FIG. 16 is a view illustrating a first example of an item exhibit screen.
Figure 17:
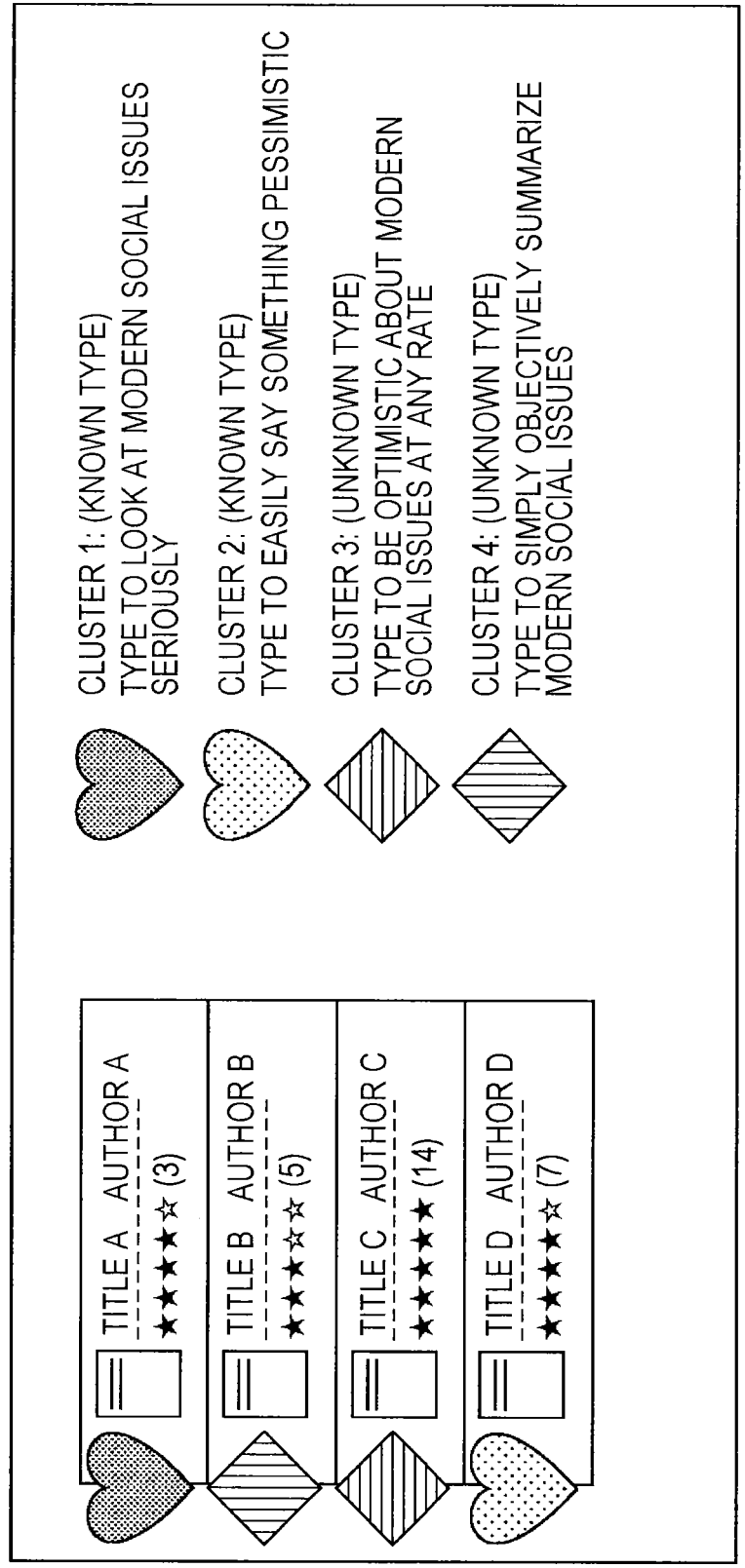
FIG. 17 is a view illustrating a second example of the item exhibit screen.
Figure 18:
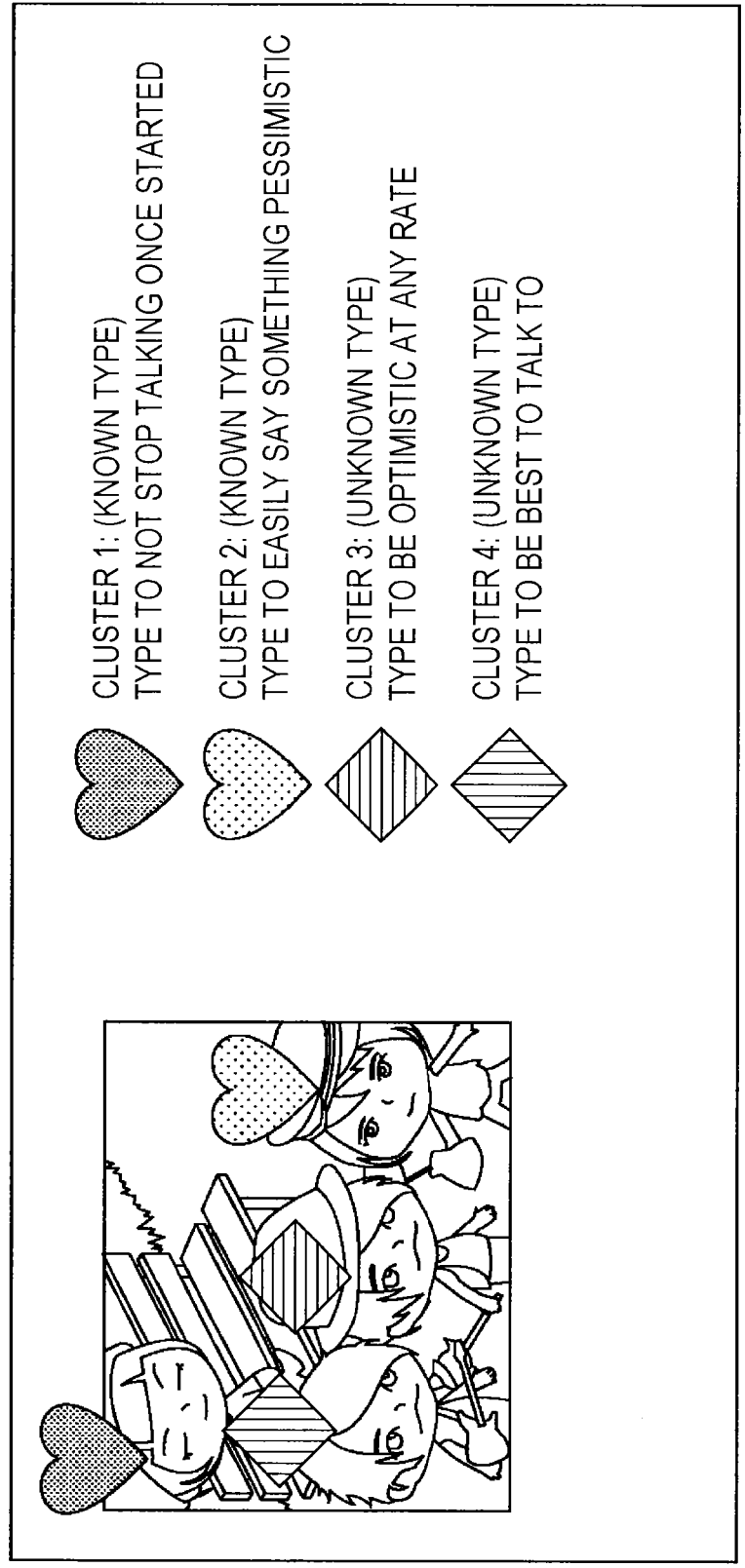
FIG. 18 is a view illustrating a third example of the item exhibit screen.

FIGS. 16 to 18 are views illustrating examples of the item exhibit screen.

FIG. 16 illustrates an example of an item exhibit screen displaying clusters of the applied clustering standard as a list. Here, the exhibited items are musical tracks, and an example in a case where the number of exhibited known type clusters L=2 and the number of exhibited unknown type clusters M=4 is shown.

In the example, the known type clusters and the unknown type clusters are respectively displayed in predetermined areas 101a to 101f of the screen as "unknown areas" and "familiar areas". More specifically, movie tie-up tracks, variety program tie-up tracks, commercial tie-up tracks, and late-night anime tie-up tracks correspond to the unknown type clusters (unknown areas), and are displayed in the areas 101a to 101d. Drama tie-up tracks and 80s anime tie-up tracks correspond to the known type clusters (familiar areas), and are displayed in the areas 101e and 101f. Further, the areas 101a to 101d and the areas 101e and 101f are color-coded so that the unknown type clusters and the known type clusters are easily distinguishable.

Further, blowout boxes 102a to 102f are displayed for each area 101a to 101f. Further, the name of the cluster and the titles of a plurality of representative tracks out of the musical tracks included in the cluster are displayed in the blowout boxes 102a to 102f. In so doing, the user is easily able to ascertain what sort of cluster each cluster is, and what types of musical tracks are included therein.

Furthermore, by selecting any one of the areas 101a to 101f, the user is able to, for example, display information or a list of musical tracks included in the selected cluster, or play or purchase musical tracks.

In so doing, the user is easily able to tell that there are musical tracks of types not yet known to the user. Further, since known type clusters based on the same clustering standard are displayed along with the unknown type clusters, the user is easily able to ascertain the contents of the unknown type clusters based on the relationship with the known type clusters.

Therefore, the user is reassured by the unknown type clusters, the psychological barriers for accepting the unknown type clusters are lowered, and it is easier for unknown type musical tracks to be accepted. As a result, the user obtains new knowledge with respect to music, and it is easier to broaden the range of musical interests.

FIG. 17 illustrates an example of an item exhibit screen displaying a plurality of items along with the clusters to which each item belong. Here, an example in a case where the exhibited items are books and the number of exhibited known type clusters L=2 and the number of exhibited unknown type clusters M=2 is shown.

Clusters 1 to 4 of the applied clustering standard are displayed as a list on the right side of the screen. Furthermore, whether each cluster is a known type cluster or an unknown type cluster, and the cluster name of each cluster are displayed. For example, the cluster 1 is a known type cluster, and the cluster name is "type to look at modern social issues seriously".

Further, respectively different marks are given to each cluster so the cluster are able to be identified with one look, and the marks are displayed to the left side of the description portion of each cluster. More specifically, differently shaped marks are given to known type clusters and unknown type clusters. Here, a heart-shaped mark is given to known type clusters, and a diamond-shaped mark is given to unknown type clusters. Further, the same shaped marks are distinguished by colors and patterns.

A list of books is displayed on the left side of the screen. The method of selecting the books to be displayed as a list is not particularly limited, and for example, books that are searched according to predetermined conditions and books that the server 11 recommends are displayed as a list. Further, the cover photograph, the title, the author, user evaluations, the number of evaluations, and the like are displayed for each book.

Further, a mark representing the cluster to which each book belongs is displayed to the left of the cover photograph of each book. The mark matches one of the marks on the list of cluster on the right side. Therefore, the user is easily able to ascertain whether each of the books displayed as a list is a book of a known type or an unknown type to the user. Further, the user is easily able to ascertain the clusters to which the books displayed as a list belong.

Furthermore, the user is able to display more detailed information or purchase selected books, for example, by selecting desired books from the list of books.

In so doing, the user is easily able to tell that there are books of types not yet known to the user. Further, through the same reasons as the case of the item exhibit screen of FIG. 16, the user is reassured by the unknown type clusters, the psychological barriers for accepting the unknown type clusters are lowered, and it is easier for unknown type books to be accepted. As a result, the user obtains new knowledge with respect to books, and it is easier to broaden the range of reading.

Similarly to the example of FIG. 17, FIG. 18 illustrates an example of an item exhibit screen displaying a plurality of items along with the clusters to which each item belongs. Here, an example in a case where communication partners (that is, other users) are exhibited as items in a communication space such as an SNS (Social Networking Service) is shown. Further, an example in a case where the number of known type clusters is L=2 and the number of unknown type clusters is M=2 is shown.

Similarly to the right side of the item exhibit screen of FIG. 17, the clusters 1 to 4 of the applied clustering standard are displayed on the right side of the screen as a list. For example, the cluster 1 is a known type cluster, and the cluster name is "type to not stop talking once started". Further, similar marks to those on the item exhibit screen of FIG. 17 are given to each cluster, and the marks are displayed to the left side of the description portion of each cluster.

User images representing partners with which communication is possible are displayed within an image representing the communication space, for example, on the left side of the screen. Further, a mark representing the cluster to which each user belongs is displayed on each user image. The mark matches one of the marks on the list of clusters on the right side. Therefore, the user is easily able to ascertain whether other users in the communication space are types with whom there has been no interaction in the past (unknown type) or there has been an interaction in the type (known type). Further, the user is easily able to ascertain the personalities of other users based on the clusters to which the other users belong.

Furthermore, the user is able to select and interact with desired users in the communication space.

In so doing, the user is easily able to find and interact with users suited to their own tastes. Further, the user is easily able to realize that there are users of a type with whom there is yet to be any interaction. Further, through the same reasons as the case of the item exhibit screen of FIG. 16, the user is reassured by the unknown type clusters, the psychological barriers for accepting the unknown type clusters are lowered, and it is easier for unknown type users to be accepted. As a result, the user interacts with unknown type users, and it is easier to broaden the range of interactions.

As described above, the known type items and the unknown type items are categorized for each user, and the known type cluster and the unknown type clusters are clearly separated based on the same clustering standards and exhibited in a simple manner by designated proportions.

Through the above, the user is able to learn of the existence of unknown areas that are hard to find by themselves. Further, as described above, since it is easier for the user to accept unknown areas, it is easier to expand the knowledge of the user.

Further, by collecting the clustering standard information from the outside, it is possible to categorize and exhibit items, for example, using clustering standards exceeding a range conceived by the service provider.

2. MODIFICATION EXAMPLES

Hereinafter, modification examples of the embodiments of the present disclosure will be described.

Modification Example 1

Modification Example of Selection Method of Applied Clustering Standard

The method of selecting the applied clustering standard described above is an example, and it is possible to adopt other methods.

While an example in which the applied clustering standard is selected from clustering standards with exactly L+M clusters in the description above, the applied clustering standard may be selected from clustering standards with L+M or more clusters.

In such a case, for example, L clusters with the highest known type cluster probabilities may be selected from the clusters of the applied clustering standard to be known type clusters, and M clusters from the remaining clusters may be selected to be unknown type clusters. At this time, for example, M clusters with the lowest known type cluster probabilities may be selected to be the unknown type clusters, or M clusters may be randomly selected from clusters with known type cluster probabilities of equal to or less than a predetermined threshold value to be the unknown type clusters.

Further, for example, the applied clustering standard may be selected from clustering standards with L or more clusters with known type cluster probabilities of equal to or greater than a predetermined threshold value (for example, 0.7 (70%)) and M or more clusters with known type cluster probabilities of equal to or less than a predetermined threshold value (for example, 0.3 (30%)) (hereinafter referred to as clustering standard candidates). In so doing, L clusters with a high proportion of unknown type items and M clusters with a high proportion of unknown type items are reliably selected.

In such a case, for example, the clustering standard with the highest known type cluster probability of the cluster with the Lth highest known type cluster probability may be selected from the clustering standard candidates as the applied clustering standard. Alternatively, for example, the clustering standard with the lowest known type cluster probability of the cluster with the Mth lowest known type cluster probability may be selected from the clustering standard candidates as the applied clustering standard. Further, for example, the applied cluster standard may be selected from the clustering standard candidates by considering the known type cluster probabilities of both the cluster with the Lth highest known type cluster probability and the cluster with the Mth lowest known type cluster probability.

Alternatively, for example, the applied clustering standard may be selected randomly from the clustering standard candidates.

Furthermore, while an example of selecting one applied cluster standard has been shown in the description above, a plurality of applied clustering standards may be selected, which may be combined to categorize the items.

Modification Example 2

Modification Example of Exhibit Method of Items

The item exhibit screen described above is an example, and items may be exhibited by other display methods.

Further, only the clusters of the applied clustering standard may be exhibited without exhibiting the items. For example, in the item exhibit screen of FIG. 16, only the cluster names may be displayed without displaying the representative tracks of each cluster. Furthermore, in a case where a cluster is selected by the user, the item belonging to the selected cluster may be exhibited.

Modification Example 3

Other Modification Examples

For example, in the item space illustrated in FIG. 4, the distance between items (that is, the similarity of the feature amounts of items) depends on the preferences, peculiarities, values, and the like of the user. Therefore, different item spaces may be formed for each user by taking the preferences, peculiarities, values, and the like of the users into consideration.

Further, while an example in which the item categorization unit 54 obtains known item collections and categorizes the items has been shown in the description above, for example, the items may be categorized by obtaining unknown item collections or both known and unknown item collections.

Configuration Example of Computer

The series of processes described above is able to be executed by hardware or by software. In a case where the series of processes is executed by software, a program configuring the software is installed on a computer. Here, a computer includes a computer built into dedicated hardware, general-purpose personal computers, for example, that are able to execute various functions by installing various programs, and the like.

Figure 19:
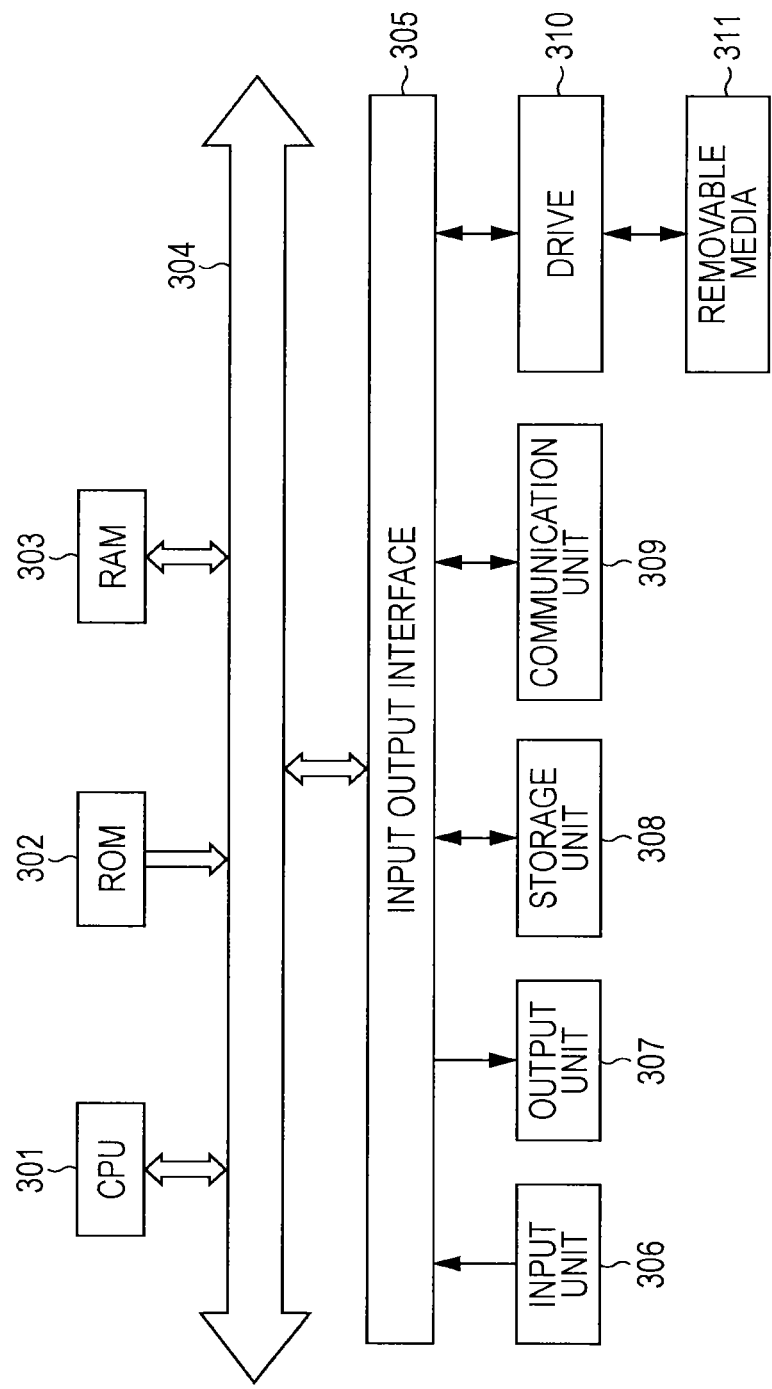
FIG. 19 is a block diagram illustrating a configuration example of a computer.

FIG. 19 is a block diagram illustrating a configuration example of hardware of a computer executing the series of processes described above through a program.

In the computer, a CPU (Central Processing Unit) 301, a ROM (Read Only Memory) 302, and a RAM (Random Access Memory) 303 are connected to each other by a bus 304.

An input output interface 305 is further connected to the bus 304. An input unit 306, an output unit 307, a storage unit 308, a communication unit 309, and a drive 310 are connected to the input output interface 305.

The input unit 306 is formed of a keyboard, a mouse, a microphone, and the like. The output unit 307 is formed of a display, a speaker, and the like. The storage unit 308 is formed of a hard disk, a non-volatile memory, or the like. The communication unit 309 is formed of a network interface or the like. The drive 310 drives a removable medium 311 which is a magnetic disk, an optical disc, a magneto-optical disc, a semiconductor memory, or the like.

In a computer configured as described above, the series of processes described above is performed by the CPU 301 loading and executing a program stored in the storage unit 308 on the RAM 303 via the input output interface 305 and the bus 304.

The program that the computer (CPU 301) executes is able to be provided by being recording on the removable medium 311 as a package medium or the like, for example. Further, the program is able to be provided via a wired or wireless transmission medium such as a local area network, the Internet, or digital satellite broadcasting.

In the computer, the program is able to be installed on the storage unit 308 via the input output interface 305 by fitting the removable medium 311 on the drive 310. Further, the program is able to be received by the communication unit 309 via a wired or wireless transmission medium and installed on the storage unit 308. Otherwise, the program is able to be installed on the ROM 302 or the storage unit 308 in advance.

Here, the program that the computer executes may be a program in which processes are performed in time series in the order described in the present specification, or may be a program in which processes are performed parallel at desired timings such as when there is a callout.

Further, in the present specification, a system refers to a collection of a plurality of constituent elements (device, modules (parts), and the like), and it is not important that all constituent elements are within the same housing. Therefore, a plurality of devices stored in separate housings and connected via a network, and one device in which a plurality of modules are stored in one housing are both systems.

Furthermore, the embodiments of the present disclosure are not limited to the embodiments described above, and various modifications are possible without departing from the gist of the embodiments of the present disclosure.

For example, the embodiments of the present disclosure are able to adopt the configuration of cloud computing in which one function is divided and processed together by a plurality of devices via a network.

Further, each step described in the flowcharts described above is able to be executed by one device, and is also able to be executed by a plurality of devices by being divided.

Furthermore, in a case where a plurality of processes are included in one step, the plurality of processes included in the one step are able to be executed by one device, and are also able to be executed by a plurality of devices by being divided.

Further, for example, the embodiments of the present disclosure are able to adopt the following configuration.

(1)

An information processing device including:

a clustering standard selection unit selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value; and an exhibit control unit controlling the exhibit of a cluster or an item based on the selected clustering standard.

(2)

The information processing device according to (1), wherein the exhibit control unit performs a control to exhibit the first number of known type clusters and the second number of unknown type clusters from clusters of the selected clustering standard.

(3)

The information processing device according to (2), wherein the exhibit control unit performs a control to exhibit the first number of known type clusters and the second number of unknown type clusters along with at least a portion of the items included in each cluster.

(4)

The information processing device according to (2), wherein the exhibit control unit performs a control to further exhibit each item along with the clusters to which the items belong.

(5)

The information processing device according to any one of (2) to (4), wherein the exhibit control unit performs a control to distinguish between and exhibit the known type clusters and the unknown type clusters.

(6)

The information processing device according to any one of (1) to (5), wherein the clustering selection unit selects the probabilities of the first number of cluster groups with the highest probabilities and the clustering standard with the greatest possibility of the probabilities of other cluster groups being generated from a different probability distribution.

(7)

The information processing device according to any one of (1) to (6), wherein the clustering standard selection unit selects a clustering standard from the clustering standards that are equal in number of clusters to a total of the first number and the second number.

(8)

The information processing device according to any one of (1) to (7), further including:

a clustering standard learning unit performing learning of a model for categorizing the items by the clustering standards.

(9)

The information processing device according to any one of (1) to (8), further including:

a clustering standard information collection unit collecting information relating to the clustering standards.

(10)

The information processing device according to any one of (1) to (9), further including:

an item categorization unit categorizing items known to the user and items unknown to the user.

(11)

The information processing device according to (10), further including:

an item discriminator learning unit performing learning of an item discriminator for discriminating whether an item is known to the user or is unknown to the user.

(12)

An information processing method including: causing an information processing device to select a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value, and causing the information processing device to control the exhibit of a cluster or an item based on the selected clustering standard.

(13)

A program causing a computer to execute:

selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value; and controlling the exhibit of a cluster or an item based on the selected clustering standard.

(14)

An information processing device including:

a clustering standard selection unit selecting a clustering standard, from clustering standards categorizing items into a plurality of clusters, including a first number or more known type clusters in which the probability that an item belonging to a cluster is known to a user is equal to or greater than a first threshold value and a second number or more unknown type clusters in which the probability is equal to or less than a second threshold value which is less than the first threshold value, which is also the clustering standard with the greatest possibility of the probabilities of the first number of cluster groups with the highest probabilities and the probabilities of other cluster groups being generated from a different probability distribution; and an exhibit control unit controlling the exhibit of a cluster or an item based on the selected clustering standard.

The present disclosure contains subject matter related to that disclosed in Japanese Priority Patent Application JP 2011-234553 filed in the Japan Patent Office on Oct. 26, 2011, the entire contents of which are hereby incorporated by reference.

What is claimed is:

1. An information processing device comprising:
 circuitry configured to:
 store browsing history information of items by a user;
 store feature amounts information of the items;
 select a clustering standard, from clustering standards categorizing the items into a plurality of clusters, such that a number of clusters categorized as a known type cluster, in which a probability that an item belonging to the known type cluster is equal to or greater than a first threshold value, is greater than or equal to a first number, the first number being an integer greater than or equal to 1, and such that a number of clusters categorized as an unknown type cluster, in which the probability is equal to or less than a second threshold value, the second threshold value being less than the first threshold value, is greater than or equal to a second number, the second number being an integer greater than or equal to 1; and
 exhibit the items categorized into the first number of know type clusters and the second number of unknown type clusters categorized based on the selected clustering standard, wherein
 the circuitry extracts known items, which are already browsed by the user, from the items based on the browsing history information;
 the circuitry calculates the probability based on a similarity between an item and the known item using the feature amount information; and
 the circuitry selects the clustering standard based on the calculated probability.

2. The information processing device according to claim 1, wherein the circuitry performs a control to exhibit the first number of known type clusters and the second number of unknown type clusters from clusters of the selected clustering standard.

3. The information processing device according to claim 2, wherein the circuitry performs a control to exhibit the first number of known type clusters and the second number of unknown type clusters along with at least a portion of the items included in each said cluster.

4. The information processing device according to claim 2, wherein the circuitry performs a control to further exhibit each item along with the clusters to which the items belong.

5. The information processing device according to claim 2, wherein the circuitry performs a control to distinguish between and exhibit the known type clusters and the unknown type clusters.

6. The information processing device according to claim 1, wherein the circuitry selects the clustering standard with a greatest possibility of the probabilities of the clusters categorized as the known type cluster and the probabilities of the clusters categorized as the unknown type cluster being generated from a different probability distribution.

7. The information processing device according to claim 1, wherein the circuitry selects the clustering standard from the clustering standards that are equal in number of clusters to a total of the first number and the second number.

8. The information processing device according to claim 1, wherein the circuitry performs learning of a model for categorizing the items by the clustering standards.

9. The information processing device according to claim 1, wherein the circuitry collects information relating to the clustering standards.

10. The information processing device according to claim 1, wherein the circuitry categorizes items known to the user and items unknown to the user.

11. The information processing device according to claim 10, wherein the circuitry performs a discrimination of whether an item is known to the user or unknown to the user, and performs learning of the discrimination.

12. An information processing method comprising:
 storing browsing history information of items by a user;
 storing feature amounts information of the items;
 selecting, using circuitry, a clustering standard, from clustering standards categorizing the items into a plurality of clusters, such that a number of clusters categorized as a known type cluster, in which a probability that an item belonging to the known type cluster is equal to or greater than a first threshold value, is greater than or equal to a first number, the first number being an integer greater than or equal to 1, and such that a number of clusters categorized as an unknown type cluster, in which the probability is equal to or less than a second threshold value, the second threshold value being less than the first threshold value, is greater than or equal to a second number, the second number being an integer greater than or equal to 1; and
 exhibiting the items categorized into the first number of know type clusters and the second number of unknown type clusters categorized based on the selected clustering standard, wherein
 the method further comprises:
 extracting known items, which are already browsed by the user, from the items based on the browsing history information;
 calculating the probability based on a similarity between an item and the known item using the feature amount information; and
 selecting the clustering standard based on the calculated probability.

13. A non-transitory computer readable medium including executable instructions, which when executed by a computer cause the computer to execute an information processing method comprising:
 storing browsing history information of items by a user;
 storing feature amounts information of the items;
 selecting a clustering standard, from clustering standards categorizing the items into a plurality of clusters, such that a number of clusters categorized as a known type cluster, in which a probability that an item belonging to the known type cluster is equal to or greater than a first threshold value, is greater than or equal to a first number, the first number being an integer greater than or equal to 1, and such that a number of clusters categorized as an unknown type cluster, in which the probability is equal to or less than a second threshold value, the second threshold value being less than the first threshold value, is greater than or equal to a second number, the second number being an integer greater than or equal to 1; and exhibiting the items categorized into the first number of know type clusters and the second number of unknown type clusters categorized based on the selected clustering standard, wherein
the method further comprises:
extracting known items, which are already browsed by the user, from the items based on the browsing history information;
calculating the probability based on a similarity between an item and the known item using the feature amount information; and
selecting the clustering standard based on the calculated probability.

\* \* \* \* \*